US010936169B2

(12) United States Patent
Nikolaidis et al.

(10) Patent No.: US 10,936,169 B2
(45) Date of Patent: *Mar. 2, 2021

(54) MEDIA EFFECTS SYSTEM

(71) Applicant: Cloneless Media, LLC, Portland, OR (US)

(72) Inventors: Ada Nikolaidis, Portland, OR (US); Ryan John Nikolaidis, Portland, OR (US); Tony Piyapat Tung, Portland, OR (US)

(73) Assignee: Cloneless Media, LLC, Portland, OR (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/707,785

(22) Filed: Sep. 18, 2017

(65) Prior Publication Data

US 2018/0004400 A1  Jan. 4, 2018

Related U.S. Application Data

(63) Continuation of application No. 14/793,709, filed on Jul. 7, 2015, now Pat. No. 9,766,789.

(Continued)

(51) Int. Cl.
*G06F 3/0484* (2013.01)
*G06F 3/0481* (2013.01)
(Continued)

(52) U.S. Cl.
CPC ...... *G06F 3/04842* (2013.01); *G06F 3/04817* (2013.01); *G06F 8/38* (2013.01); *G06F 9/44505* (2013.01)

(58) Field of Classification Search
CPC ............ G06F 3/04842; G06F 3/04817; G06F 9/44505; G06F 16/168; G06F 16/178;
(Continued)

(56) References Cited

U.S. PATENT DOCUMENTS 5,649,171 A   7/1997 Craven et al.
5,680,524 A   10/1997 Maples et al.
(Continued)

OTHER PUBLICATIONS

Guerraz. Agnès et al., "Multimedia Authoring for Communities of Teachers", International Journal of Web-Based Learning and Technologies, vol. 2, Issue 3, 3 pages, IGI Publishing Hershey, PA.
(Continued)

*Primary Examiner* — Evan Aspinwall
(74) *Attorney, Agent, or Firm* — Vobach IP Law, LLC

(57) ABSTRACT

In accordance with one embodiment, a method can be implemented that includes accessing a first data file associated with a first media application program, wherein the first data file includes a first identifier associated with a first designer-specified variable for controlling the first media application program; accessing a second data file associated with a second media application program, wherein the second data file includes a second identifier associated with a second designer-specified variable for controlling the second media application program; receiving with a computer processor the first designer-specified variable; receiving with the computer processor the second designer-specified variable.

19 Claims, 13 Drawing Sheets

Related U.S. Application Data

(60) Provisional application No. 62/021,611, filed on Jul. 7, 2014.

(51) Int. Cl.
  *G06F 8/38* (2018.01)
  *G06F 9/445* (2018.01)

(58) Field of Classification Search
  CPC .......... G06F 16/26; G06F 16/44; G06F 17/24; G06F 2221/2137; G06F 2221/2151; G06F 8/38; H04L 51/046
  USPC ....................................... 707/804
  See application file for complete search history.

(56) References Cited

U.S. PATENT DOCUMENTS

| | | | |
|---|---|---|---|
| 6,216,261 B1 | 4/2001 | Mitchell | |
| 7,624,337 B2 | 11/2009 | Sull et al. | |
| 7,660,510 B2 | 2/2010 | Kawahara et al. | |
| 7,669,117 B2 | 2/2010 | Albornoz et al. | |
| 7,860,823 B2 | 12/2010 | Hejlsberg et al. | |
| 8,701,023 B1 | 4/2014 | Zhaksilikov et al. | |
| 8,707,366 B2 | 4/2014 | Wong et al. | |
| 9,390,752 B1 | 7/2016 | McNeil et al. | |
| 2002/0018078 A1 | 2/2002 | Khan et al. | |
| 2005/0246331 A1* | 11/2005 | De Vorchik | G06F 16/192 |
| 2006/0176403 A1 | 8/2006 | Gritton et al. | |
| 2009/0125609 A1* | 5/2009 | Wood | G11B 27/00 709/219 |
| 2009/0183117 A1* | 7/2009 | Chang | G06F 17/248 715/810 |
| 2009/0327238 A1* | 12/2009 | Leece | G06F 16/44 |
| 2010/0005411 A1* | 1/2010 | Duncker | G06Q 30/0601 715/769 |
| 2011/0107227 A1 | 5/2011 | Rempell et al. | |
| 2012/0081375 A1* | 4/2012 | Robert | G06F 9/445 345/522 |
| 2012/0084644 A1* | 4/2012 | Robert | G06F 16/168 715/255 |
| 2013/0007071 A1* | 1/2013 | Westphal | G06F 8/34 707/805 |
| 2014/0071045 A1* | 3/2014 | Muchnick | G06T 11/60 345/156 |
| 2014/0250480 A1 | 9/2014 | Koh et al. | |
| 2015/0023651 A1 | 1/2015 | Axen et al. | |
| 2015/0234564 A1* | 8/2015 | Snibbe | G06F 3/0488 715/716 |
| 2015/0370819 A1* | 12/2015 | Kothandam | G06F 40/194 707/722 |
| 2016/0054873 A1* | 2/2016 | Snibbe | G06F 3/0412 715/719 |

OTHER PUBLICATIONS

Abrams, Marc et al., "UIML: An appliance-independent XML user interface language" Harmonia, Garvin Innovation Center, Blacksburg, Virginia, 14 pages.

* cited by examiner

MEDIA EFFECTS SYSTEM

CROSS-REFERENCE TO RELATED APPLICATIONS

This application is a continuation of U.S. non-provisional patent application Ser. No. 14/793,709 filed on Jul. 7, 2015 which claims the benefit under 35 U.S.C. § 119(e) of U.S. provisional patent application 62/021,611, filed on Jul. 7, 2014 and titled "Visual Effects System" which is hereby incorporated by reference in its entirety and for all purposes.

SUMMARY

In accordance with one embodiment, a method can be implemented that includes accessing a first data file associated with a first media application program, wherein the first data file includes a first identifier associated with a first designer-specified variable for controlling the first media application program; accessing a second data file associated with a second media application program, wherein the second data file includes a second identifier associated with a second designer-specified variable for controlling the second media application program; receiving with a computer processor the first designer-specified variable in the first data file associated with the first application program; receiving with the computer processor the second designer-specified variable in the second data file associated with the second application program; providing a computer user interface wherein the computer user interface presents a first input region for designation of a first designer-specified variable value and a second input region for designation of a second designer-specified variable value so as to allow a user of the user interface to control both the first media application program and the second media application program; communicating the first designer-specified variable value from the user interface to the first application program; and communicating the second designer-specified variable value from the user interface to the second application program.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Other features, details, utilities, and aspects of the claimed subject matter will be apparent from the following more particular written Detailed Description of various implementations and implementations as further illustrated in the accompanying drawings and defined in the appended claims.

DETAILED DESCRIPTION

An artist in the media production industry often works with a wide variety of software application programs in order to produce a special effect. The artist therefore needs to be familiar with the nuances of a wide variety of software application programs in order to manipulate them to create the special effect. As media has evolved, the demand to create more media content, faster, and at higher quality has increased dramatically. However, the software application programs used to create rich, polished visual and audio content for a feature film or broadcast television production are ill-equipped to create media in a high-volume or on-demand context.

One attempted solution has been to use a dedicated staff of artists—in some cases working around the clock—in order to make individualized media content quickly and on-demand. This has allowed responsive media experiences that engage users, but these experiences have been limited by the cost of having so many skilled artists working to create customized variations of media content. These costs may limit the duration of an experience, the availability, and the total number of individualized media assets that can ultimately be created.

In accordance with one embodiment described herein, a new user interface program is provided that does not necessarily require a user creating variations of a media content item to work directly with a multitude of software application programs. Moreover, once the user interface is constructed, a technical assistant is not necessarily needed to create new media content using the application programs.

Figure 1:
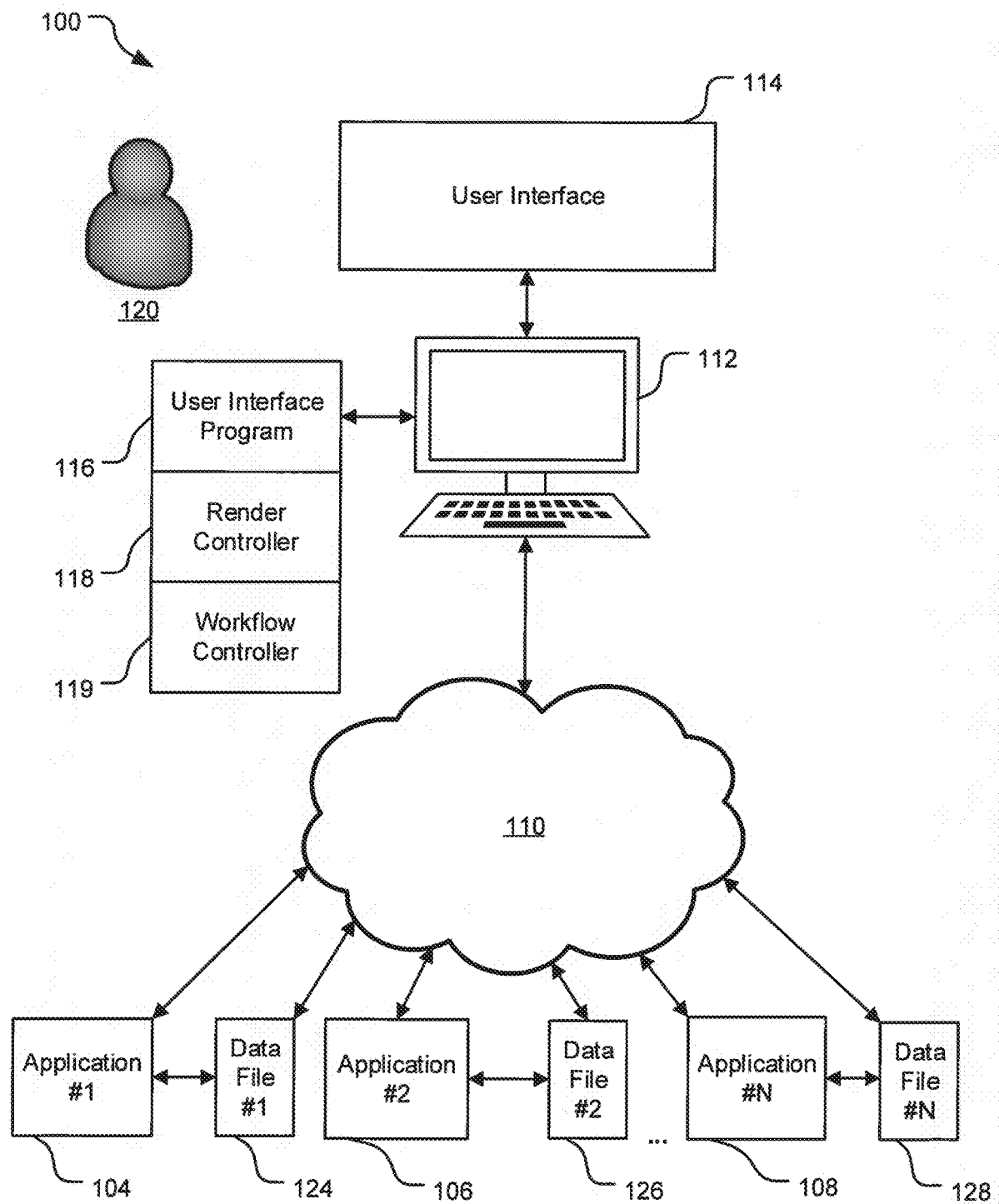
FIG. 1 illustrates an example of a system for providing a user interface that can facilitate user input for one or more application programs, in accordance with one embodiment.

An example of one embodiment is illustrated in FIG. 1. FIG. 1 shows a system 100 that includes multiple software application programs, such as Application Program #1, 104, Application Program #2, 106, and Application Program #N, 108. The application programs are in communication with a communication network 110, such as the internet. In addition, a user's computer 112 is also in communication with the network 110. The user's computer can implement a user interface program 116 to provide a user interface 114 for use by the user 120. Each application program operates on its own respective data file. Thus, Application Program #1 uses data file #1, 124. Application Program #2 uses data file #2, 126. Application Program #N, uses data file #N, 128. As will be explained below, the data files can also be accessed for use by the computer that controls the user interface. It should be appreciated that in some embodiments the first and/or second data files might be the output files from other application programs. In some other embodiments, the first and/or second data files may be a structured set of arguments supplied to an application program, such as using a command line interface.

A render controller 118 can be used to invoke a render of a media effect. In some embodiments, the render controller can cause data to be conveyed to the appropriate data file or application program. The render controller can be integrated as a part of the user interface program or configured separately. A workflow controller 119 can store the procedure for invoking different application programs used to create a media effect. The workflow controller can be integrated as part of the user interface program or render controller or implemented as a separate program. When a designer designs a media effect, the designer can program the workflow controller with the appropriate sequence of application programs to operate on the media data and user input data. Then, when a user signals that an effect should be rendered, the sequence of programs stored by the workflow controller can be invoked.

The user interface allows the user to adjust certain parameters of the various application programs. In one embodiment this can be accomplished by a special effects designer creating a user interface for use by a user, such as a non-technical user. The user interface can be designed to receive input by a user of values for various input parameters needed by each application program to implement a programmed special effect. Moreover, the user interface can be tailored to prompt the user for some input parameters of an application program, but not necessarily all program parameters supported by the particular application program.

Figure 2:
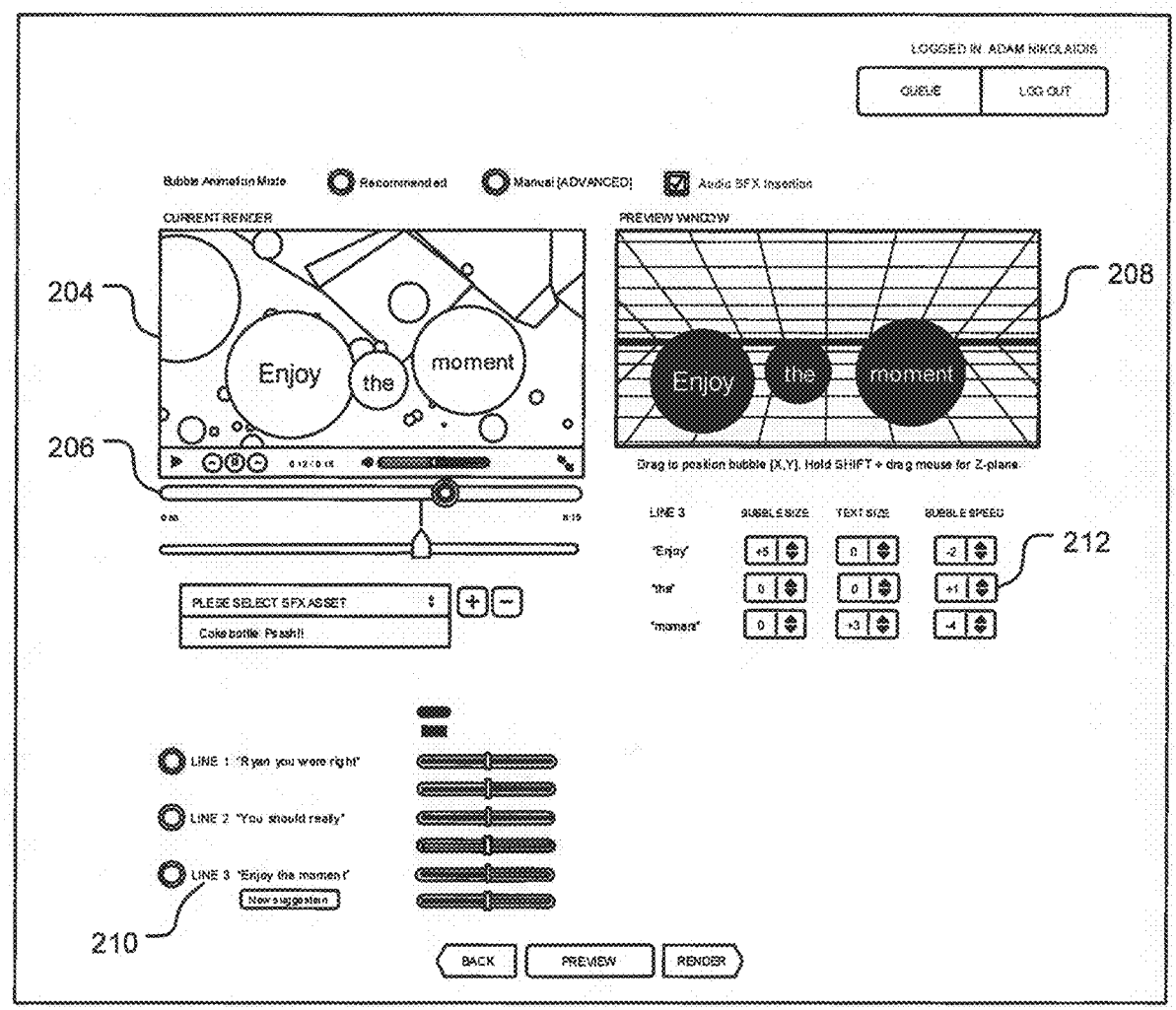
FIG. 2 illustrates an example of a user interface in accordance with one embodiment.

An example of a user interface prepared by a designer is shown in FIG. 2. FIG. 2 illustrates a user interface 200 that allows a user to manipulate a series of bubbles against a background of ice and smaller bubbles. The user interface in combination with the user interface program receives input from a user and then allows the user to initiate a workflow that invokes one or more underlying application programs to create a media effect. For example, the workflow could involve the invocation of an application program that controls the movement of the large bubbles, a second application that provides a background video of smaller bubbles and ice, an application program that provides audio, and yet another application program that compresses the combination of the previous effects.

Various input controls are shown in FIG. 2. For example, a first portion of the user interface displays a current render of a media creation. The render can be played back, paused, fast forwarded, and reversed. A slider controller 206 allows a user to receive input from a user to select a particular frame of a work for modification.

A second portion of the user interface, 208, allows a user to modify a particular configuration of the media work, for example. As can be seen in second screen portion 208, a user can modify the position of three bubbles. The user can drag the bubbles to new positions and thus determine x, y, z coordinates in this fashion. The user can also set parameters for each bubble's size, text size, and bubble speed, as shown by the controllers shown in region 212 of FIG. 2. Textual entries can also be accomplished with the user interface shown in FIG. 2. A user can modify the text and select the modified text for insertion in the media work.

Once values have been entered by a user to the user interface, the user can select the render button on the user interface. Selecting the render button causes the user interface program in combination with the user's computer processor to pass the selected values of the parameters from the user interface to the appropriate data files and/or application programs, e.g., via a command line hash of data. Selecting the render button also invokes a workflow process. The workflow process will typically involve various application programs being invoked to operate on data files and/or data input via the user interface. In some instances, this may involve a first application program being invoked in order to produce a resulting output file and then a second application program using that output file as the second application program's input file. In other instances, the process may involve a lockstep approach in which the first application program operates on a first frame of data and then makes available the processed first frame of data to a different application program. Still further, other sequences of applying the application programs to the input data can be implemented by other embodiments.

Figure 3:
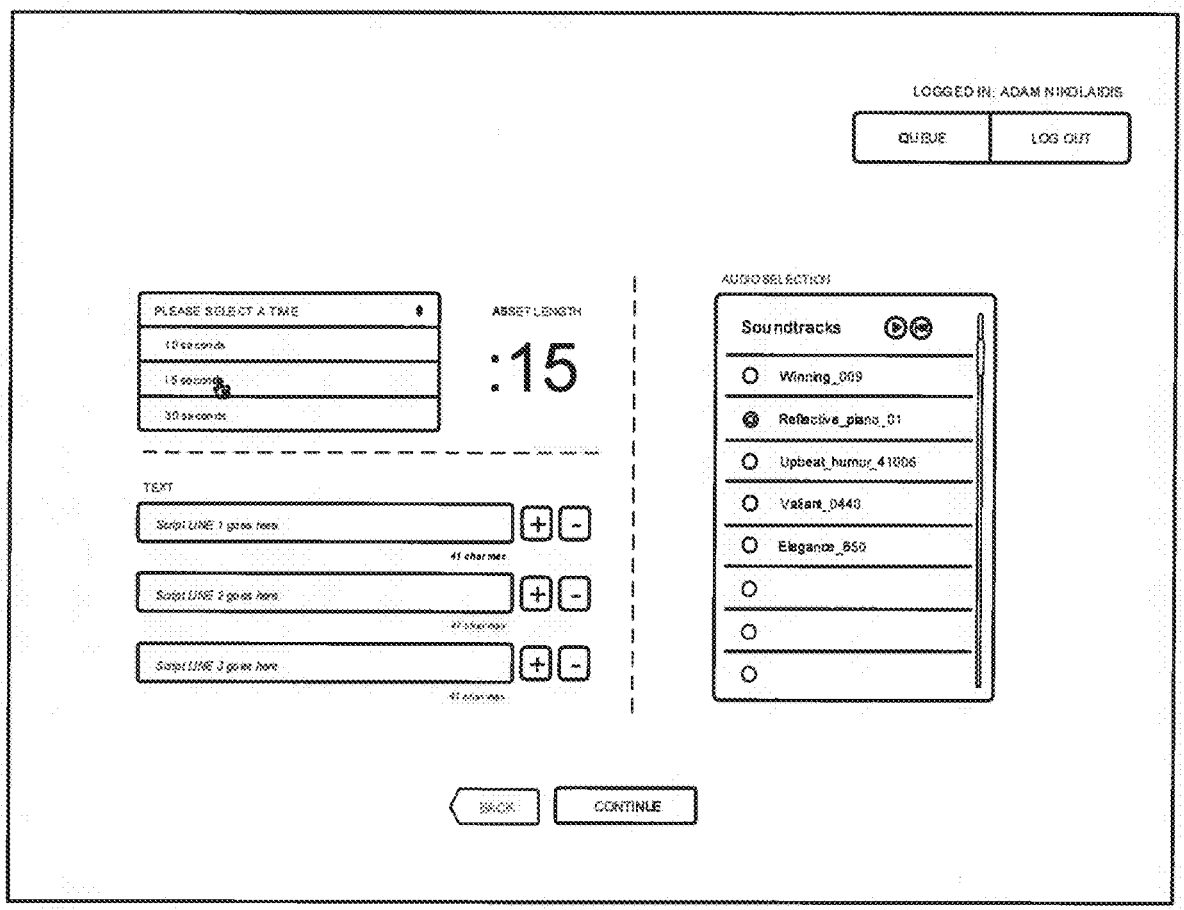
FIG. 3 illustrates another example of a user interface in accordance with another embodiment.

FIG. 3 illustrates an example of another user interface 300. In this example, a user can select a length of time for a particular media design or asset. Three input regions are provided for textual input that can be included in the media design. A region for selecting different soundtracks is also provided. The different soundtracks can be previewed via a play button. A user can select the soundtrack that he or she wishes to use.

The technology described herein facilitates the design of a user interface as well as the communication of information associated with application program variables to and from the user interface. One aspect of the technology that can be implemented to facilitate the communication to and from the user interface is the use of identifiers that are associated with respective parameters used by an application program that a user interface designer wants to allow a user, such as an artist, to control. With respect to the example shown in FIG. 2, the designer of that user interface wanted to allow an artist to provide input to control parameters such as the position of the different bubbles, the size of each bubble, the speed of each bubble, and the size of the text within each bubble. Moreover, different application programs that would be used to implement the workflow for the desired media effect would need the input values selected by the user for the parameters in order to implement the desired effect. A technical challenge faced in this process is how to communicate to the user interface when values for parameters (also referred to as variables) will be needed by the various application programs and how to communicate the values entered at the user interface by a user to data files that will be used by the application programs or in some cases directly to the application programs themselves.

One manner of communicating the existence of variables to a user interface is through the use of an identifier that is associated with a particular variable. This can be done in a data file that a designer has created for use with the user interface. The designer can identify a variable (or parameter) in a particular application program for which they want to enable the value to be changed by the user interface program. In the data file that the designer creates for a particular application program, the designer can associate in the data file that variable name with an identifier. The identifier is similarly associated with a particular application program.

In one embodiment, a user interface program may then analyze the data file to determine if the data file includes any identifiers. The user interface program has been pre-programmed to recognize the format of an identifier. If the user interface program detects an identifier in the data file being analyzed, the user interface program can enable the portion of the user interface that has been assigned to the variable associated with the identifier that the user interface program recognized.

In another embodiment, the identifier-variable pairs could be loaded directly to the user interface program without requiring the user interface program to analyze a data file to detect any identifiers-variables.

Once the user interface has been provided by the user interface program, a user may then provide input for each particular variable. Again, examples are shown in FIGS. 2 and 3. The user interface program may then provide the user provided input for use in the original data file and/or to the application program(s).

Figure 4:
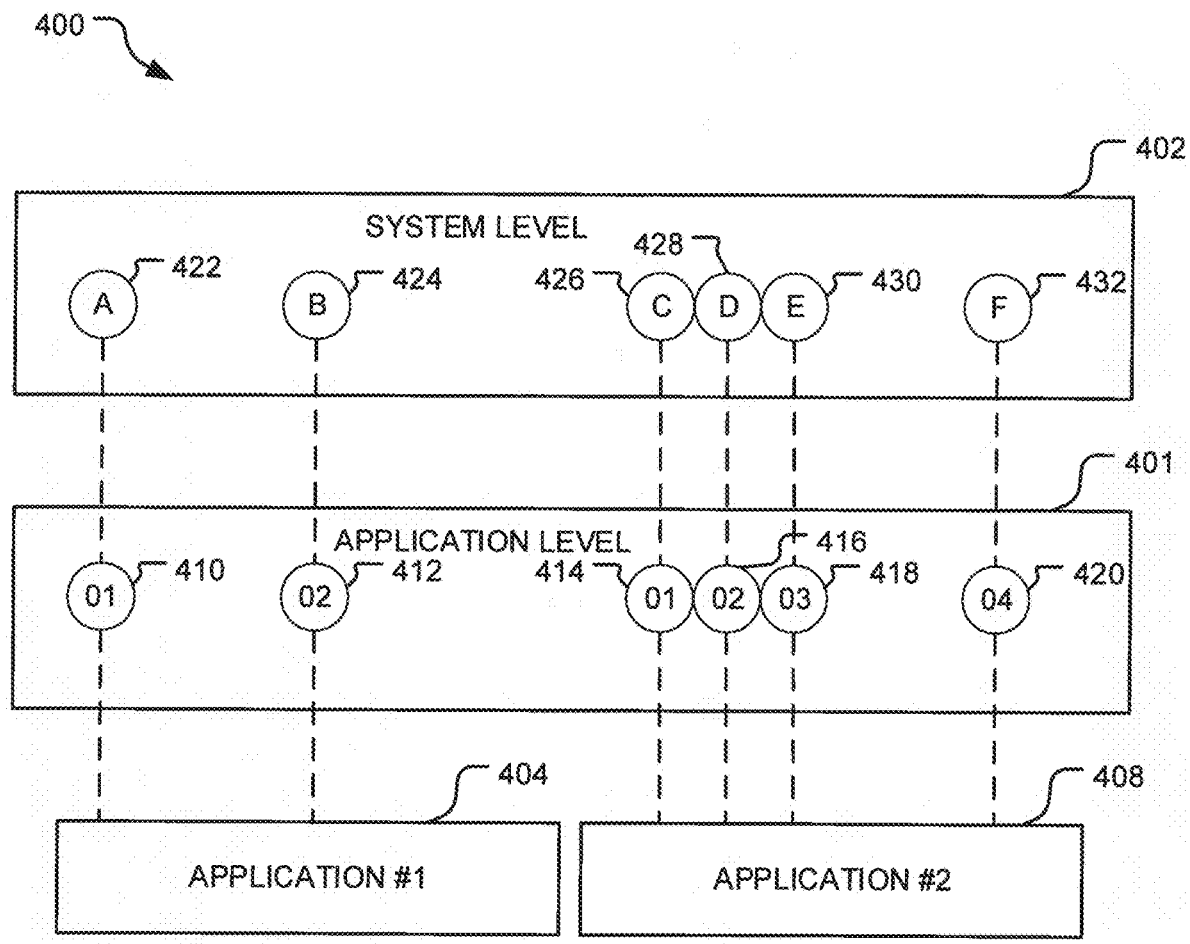
FIG. 4 illustrates a block diagram of a system for communicating variable information between application data files and a user interface, in accordance with one embodiment.

An example of the use of identifiers is shown in a system 400 of FIG. 4. FIG. 4 shows two application programs—Application #1, 404, and Application #2, 408. In the data file that Application #1 will operate on, two variables have been identified. A first variable is associated with an identifier "01", 410, while a second variable is associated with an identifier "02", 412. For example, the first variable associated with the identifier "01" could be for legal copy and assigned an input type of "text." And, the second variable associated with identifier "02" could be for a frame number and assigned an input type of "integer."

Similarly, Application #2 has four variables that need user-assigned values. Variable #1 is associated with identifier "01", 414; variable #2 is associated with identifier "02", 416; variable #3 is associated with identifier "03", 418; and variable #4 is associated with identifier "04", 420. The variable associated with identifier "03" could be for a coordinate and assigned the type "floating point." The variable associated with identifier "04" could be for a frame number and assigned an input type of "integer."

At the user interface or system level in the example of FIG. 4, these identifiers are associated with a user interface identifier. For example, identifier 410 is associated with user interface identifier "A", 422. Identifier 412 is associated with user interface identifier "B", 424. Identifier 414 is associated with user interface identifier "C", 426. Identifier 416 is associated with user interface identifier "D", 428. Identifier 418 is associated with user interface identifier "E", 430. Identifier 420 is associated with user interface identifier "F", 432. The identifiers in FIG. 4 are shown as occurring in an application level 401 and a system level 402. The identifiers in the application level are associated with application level data, while the identifiers in the system level are associated with system level data, i.e., user interface level data. The use of system level identifiers prevents the user interface program from confusing application level identifiers that are common to two different application programs. Thus, if both application #1 and application #2 use the identifier "01", the user interface program can prevent confusion by assigning a first system level identifier "A" to one of the variables and the system level identifier "C" to the other.

Figure 5:
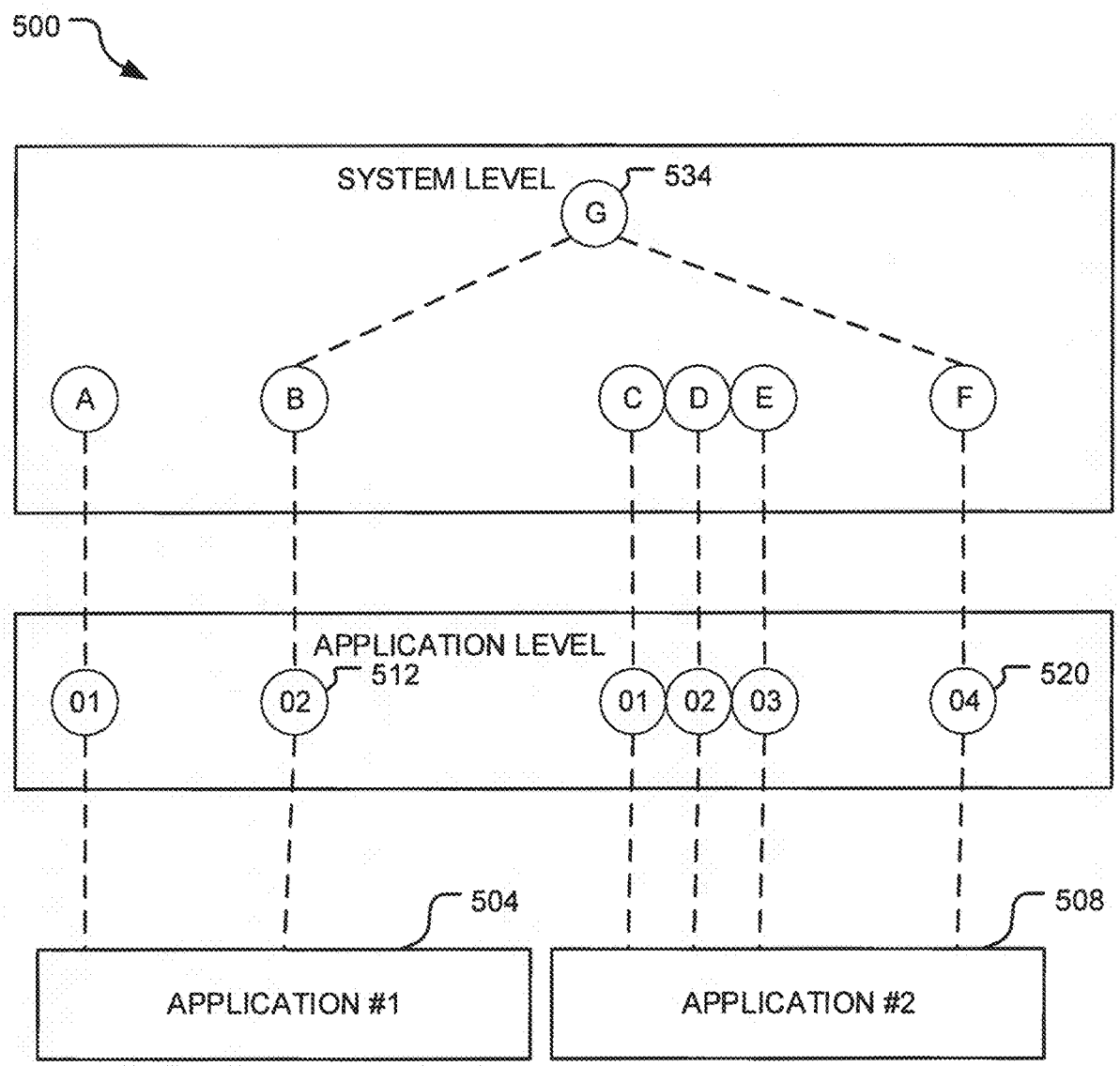
FIG. 5 illustrates a block diagram of a system for communicating variable information in accordance with one embodiment.

FIG. 5 illustrates another example of a system 500 employing identifiers to facilitate user input via a user interface. FIG. 5 is different from FIG. 4 in that a common identifier "G", 534, can be assigned to two application level identifiers that are associated with the same variable. Thus, for example, if Application #1, 504, has a frame number variable associated with identifier "02", 512, and Application #2, 508, has a frame number variable associated with identifier "04", 520, the user interface can associate system level identifier "G" with both. This allows the user interface program to obtain an input value for the user selected frame number via a single controller of the user interface.

An example of a code listing for a data file that includes identifiers and associated variables is shown below:

```
Request
POST /effect/dab9bacb-cfbd-42a2-82c1-7e78ba2c72e6/render
Accept: application/cloneless.effectserver-v1+json
Accept-Encoding: gzip, deflate
Content-Type: application/json
Accept-Language: en-us
{
    "api_key": "45j09458mcqcmzdf",
    "parameters": [
        {
            "content": "@twitteruser vs. @twitter2",
            "id": "f06f4757-f4e6-47ea-befe-43931002c001"
        },
        {
            "content": "@cloneless",
            "id": "f3a3749a-04bc-45d1-aaf1-c9e445766497"
        },
        {
            "content": "Hey! How's it going?",
            "id": "7aca112f-c7b3-4c64-8dd8-84007ac658db"
        },
        {
            "content": 7,
            "id": "e53968fa-72bf-4a6d-96cb-66b0784ec89b"
        },
        {
            "content": 12,
            "id": "d55d27a1-2be9-4cf0-ae9d-9bb38d9eb01a"
        }
    ],
    "media":[
        {
            "content": "192dc99b-1daa-467d-8349-5b9745b5f20b",
            "id": "df0c5533-f967-4902-a62c-efb3ec624594"
        },
        {
            "content": "0099d07e-bdfb-47aa-91a1-3b81c78f7648",
            "id": "5a580c8f-404f-40ed-bfb1-df7f54daf325"
        },
        {
            "content": "6c1a117e-85e2-4342-82c5-a6339228ee38",
            "id": "e51c2555-4e7d-4833-801a-e775ee070115"
        }
    ],
    "user_id": "735e9e7e-54f5-4808-6d1c-48ac36d3ba39"
}
```

The following code listing is an example of code that constructs a hash of variables for an application program using identifiers and variable values.

```
subrange = Framerange(5,23)
thread_index = self.get_next_thread_index( )
env = os.environ.copy( )
if not framerange:
    framerange = self.framerange( )
env[FRAME_IN_ARG] = str(framerange.frame_in( ))
env[FRAME_OUT_ARG] = str(framerange.frame_out( ))
env[self.out_flag( )] = self.out_path( )
content = self.incoming_parameters( )
for content_item in content:
    if ('id' in content_item) and ('value' in content_item):
        env[content_item['id']] = normalize(content_item['value'])
```

-continued

```
env.update(self.get_external_media_parameters( ))
command = self.commandline(framerange=subrange)
exec_thread = threading.Thread(target=self.thread_execute,
    args=(subrange,command,thread_index,environment))
exec_thread.start( )
```

Figure 6:
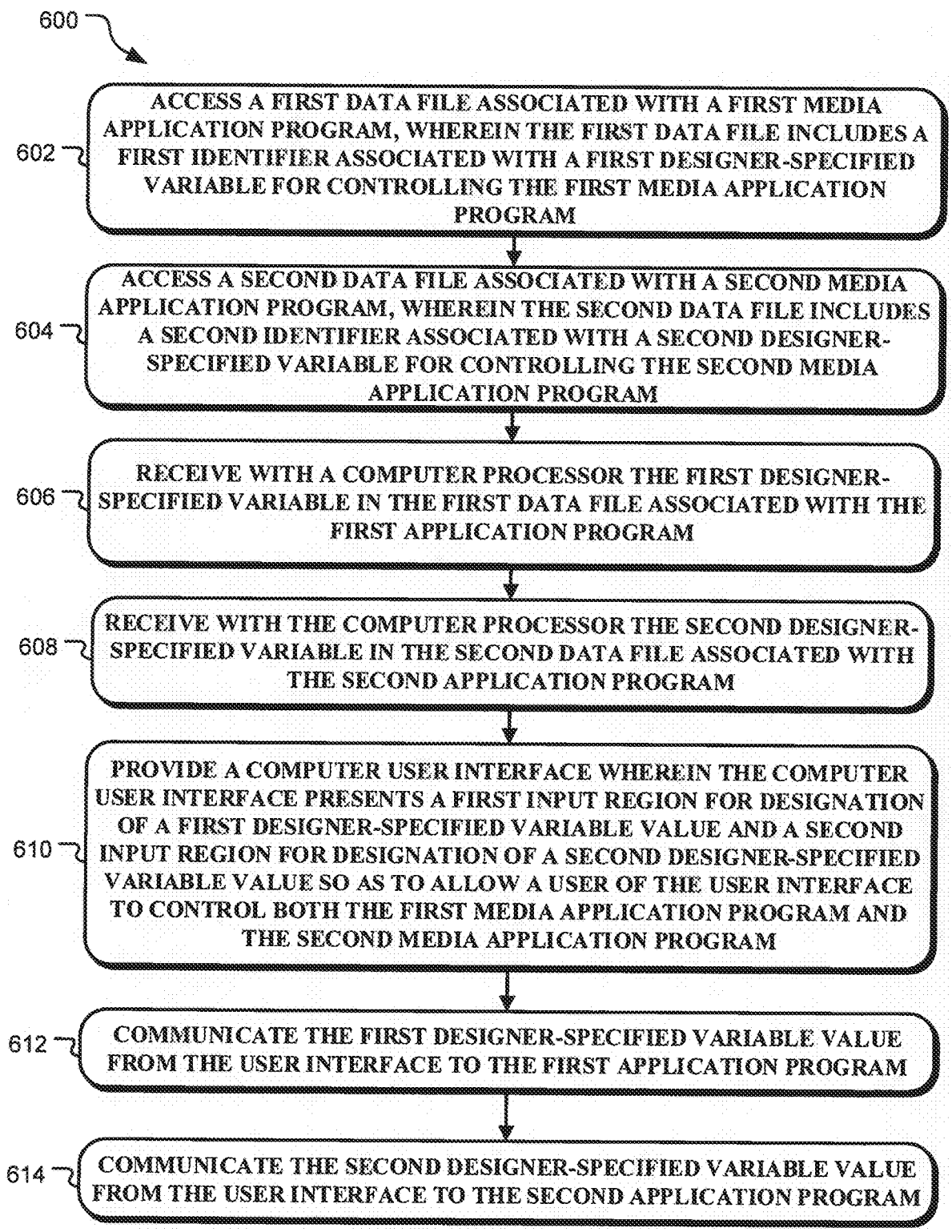
FIG. 6 is a flow chart that illustrates a method of providing a user interface in accordance with one embodiment.

FIG. 6 illustrates an overview of a method of using a user interface program to control one or more application programs without a user having to interact directly with the application program(s) or have knowledge of the workflow of selected application programs used to create an effect. In flow chart 600, a first data file that is associated with a first application program is accessed, as shown in operation 602. The first data file is a collection of data that the first application program will use as an input. Moreover, the first data file can be a data file that has been prepared by a media effect designer. The media effect designer can include variable information and associated identifiers in the first data file that a user interface program implemented by a computer processor can recognize. Thus, for example, the first data file can include a first identifier associated with a first designer-specified variable for controlling the first media application program. Additional identifiers and their associated variables can also be included in the first data file.

Similarly, operation 604 shows that a second data file can be accessed wherein the second data file is associated with a second media application program. The second data file can include a second identifier. The second identifier is associated with a second designer-specified variable for controlling the second media application program. Additional identifiers and their associated variables can also be included in the second data file.

When a computer user interface program is invoked for a particular workflow, the user interface program can launch the user interface for the workflow. In addition, the user interface can analyze the first data file and the second data file for variables that have been associated with identifiers. This allows the user interface program to determine which variables can be modified by input from the user of the user interface. Thus, operation block 606 shows that the user interface program being implemented by a computer processor receives a first designer-specified variable in the first data file that is associated with the first application program. And, operation block 608 shows that the user interface program being implemented by a computer processor receives a second designer-specified variable in the second data file that is associated with the second application program. While operation blocks 606 and 608 have been described with respect to single variables, the user interface program could readily search for multiple variables. In addition, while in the example above the data files are analyzed for identifiers/variables, in one embodiment the identifiers/variables could be input directly into the user interface program by a designer. In either instance, the user interface program receives the identifiers/variables.

The user interface program may then display a user interface, for example via a display screen for the user. A variety of user interfaces could be utilized. The examples illustrated herein illustrate graphical user interfaces. However, command line interfaces or other types of user interfaces could similarly be implemented so as to solicit input from a user.

When a graphical user interface is utilized, the computer user interface can be displayed so as to provide input controls that a user can adjust to select a desired value for a variable. Each control can be presented on a different region of the user interface. Thus, for example, a slider mechanism can be displayed to allow a user to select a speed value. And, a text blank can be displayed to allow a user to specify text for display. In sum, operation 610 illustrates that a computer user interface can be provided wherein the computer user interface presents a first input region for designation of a first designer-specified variable value and a second input region for designation of a second designer-specified variable value so as to allow a user of the user interface to control both the first media application program and the second media application program.

In operation 612, the user interface program can communicate the first designer-specified variable value that was received via the user interface to the first application program. As will be explained further herein, the communication of the first designer-specified variable value can be implemented via a variety of mechanisms. For example, it can be sent as part of a hash of data to the first application program. In some embodiments, the hash could take the form of an ordered sequence of arguments to an application program's command line interface. In other embodiments, items in the hash might be represented through environment variables wherein the variable name (or a variant thereof) represents the key, and the value of the environment variable represents the corresponding value in the hash. Alternatively, in some embodiments the designer-specified variable value can be inserted into the first application data file.

Similarly, operation 614 illustrates that the second designer specified variable value can be communicated from the user interface to the second application program.

As can be seen from the method described in FIG. 6, a user need not know anything about the particular application programs running in the background behind the user interface or the particular workflow of multiple application programs used to create a designed effect. A designer can design the user interface, design the workflow for the desired media effect, select the appropriate application programs to implement the workflow, and design the data files, if required, for the selected application programs such that a user who is using the user interface need know nothing about the application programs. Instead, the user can merely provide input to the user interface and then invoke the workflow, e.g., a render, once the input has been entered.

Once a user has entered information via the user interface, the user can invoke the workflow for a particular media effect. For example, the user can select a pre-programmed "Render" button on a graphical user interface. The program implementing the user interface recognizes this input as invoking the workflow, such as invoking the first application program. If any data needs to be conveyed to the application program(s), the data can be conveyed in response to the render button selection, as well.

As noted above, in one embodiment the user interface program can detect a variable in a data file. One manner of detecting a variable is to analyze the data file for identifiers that have been associated with variables in the data file. The user interface program, for example, can scan the data files for any identifiers. When an identifier is located, the user interface program can add the variable associated with that identifier to the user interface for adjustment. If the identifier and variable are associated with a data type, that data type can be utilized by the user interface program to provide an appropriate input field, such as integer, floating point, text, boolean, etc. to the user interface. Moreover, the identifiers allow a designer to signal to the user interface program when a particular variable requires user manipulation. For different effects, a designer will not necessarily include the same variables in data files for the same application program.

When a user does supply a value for a particular variable that has been presented via the user interface, the user interface program may then associate that value with the identifier of the variable. The identifier and user supplied value can then be communicated to an application program for use. As noted above, the user supplied value could be inserted into the previously used data file or supplied as part of a hash of data directly to an application program.

It should be appreciated that the user interface can be an application programming interface. An application programming interface is a set of routines, protocols, and tools for building software applications. An API expresses a software component in terms of its operations, inputs, outputs, and underlying types. In one example of such an embodiment, the input region for a variable might be a key index:value pair in a hash. In another embodiment, the input region might manifest as a network operation such as a REST request.

It should also be appreciated that the user interface can be provided as part of an application service provider service. Thus, a user may not own the application programs being used. Instead, the user may utilize the application service provider service to implement the media effect.

As noted herein, the user interface can do different things with the data that it receives from a user. Different application programs have different capabilities when it comes to the input and output of data. Some application programs permit a designer great freedom to supply variable data for many different types of data objects, for example text data, integer data, floating point data, boolean data, etc. In some cases instructions executing within an application program, such as an application plugin or embedded script, can access parameters passed to an application program at launch via the application program's command line. These parameters could come in, e.g., from the user interface program, as their actual data types, or may be converted from a uniform data type, like a text string, into the appropriate form, such as a boolean, integer, or floating point value. Application programs may contain data structures that correspond to these data types. For example, a supplied boolean value might determine whether an individual bubble is visible, a text string might represent the word inside of that bubble, a floating point value might represent the velocity of the bubble, and an integer might represent the starting frame of a background video asset. Other application programs are less flexible. Still other application programs are not very flexible at all. Thus, in accordance with different embodiments, unique methods can be implemented to supply variable values to different application programs depending on the input flexibility of each of those application programs.

Figure 7:
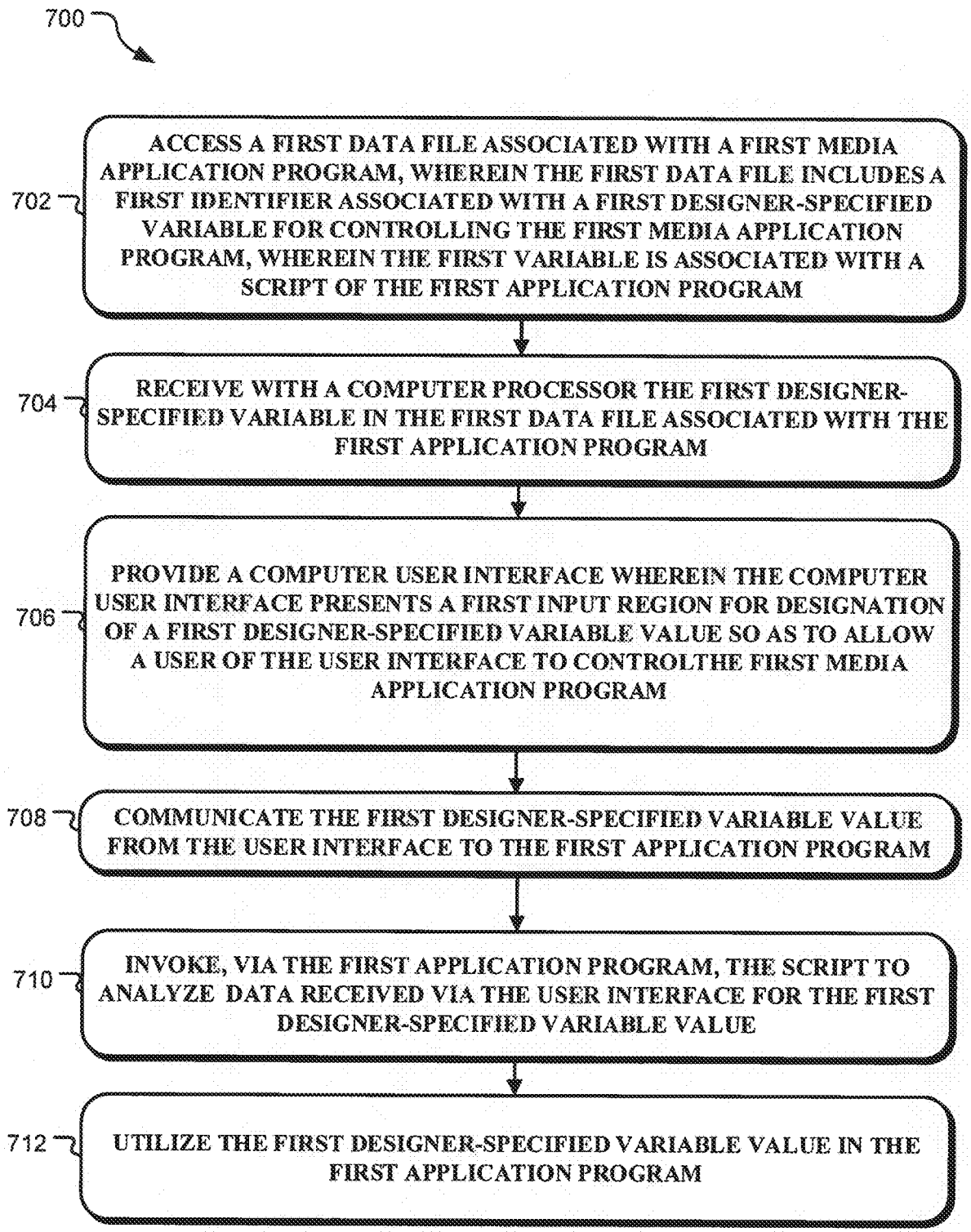
FIG. 7 is a flow chart that illustrates a method of communicating data from a user interface to an application program, in accordance with one embodiment.

FIG. 7 illustrates an example of supplying input data received via a user interface to an application program via the application program's command line. In operation 702 of flow chart 700, a first data file that is associated with a first media application program is accessed. The first data file includes a first identifier that is associated with a first designer-specified variable. The designer-specified variable is utilized by the application program during use. The first variable is also associated with an ancillary program, such as a script. For example, a script is a non-compiled program written for a special run-time environment that can interpret (rather than compile) and automate the execution of tasks. In some application programs a script is associated with a variable to permit the input of data values for that variable.

In operation 704, a user interface program can receive a first designer specified variable. For example, the user interface program implemented by a processor can analyze a first data file that is associated with a first application program to try to detect a designer-specified variable(s). If a variable is detected, the user interface program can add that variable to a user interface so that a value for the variable can be solicited from a user. Thus, operation 706 shows that a computer user interface is provided. The computer user interface can present a first input region for designation of a first designer-specified variable value. The user can input a desired value for the variable via the user interface controls.

In operation 708, the value that the user specifies for the variable is communicated from the user interface to the first application program. This can be performed by supplying the first application program with a hash of data wherein part of the data includes the variable value. As noted above, identifiers can be associated with variables in order to facilitate communication of the variable values. Thus, an identifier can be included in the hash along with the variable value so as to identify to the application program the variable that the variable value belongs to.

In operation 710, the user interface program can invoke the workflow for the designed media effect. This causes the first application program to be invoked. When the first application program is invoked, it receives the input from the user interface as well as the first data file. Each data object (variable) utilized by the first application program that is associated with a script, or other ancillary program, can run its script. For example, a script can be run to search a hash of data supplied by the user interface program for the identifier associated with the data object (variable) that the script is associated with. If the script locates its associated identifier in the hash of data, the variable value associated with the identifier in the hash of data can be assigned to the script's data object by the script. And, as shown by operation 712, the variable value can then be used by the first application program. If the script does not find an identifier in the hash of data, then in some instances the data object (variable) can use a default value.

Figure 8:
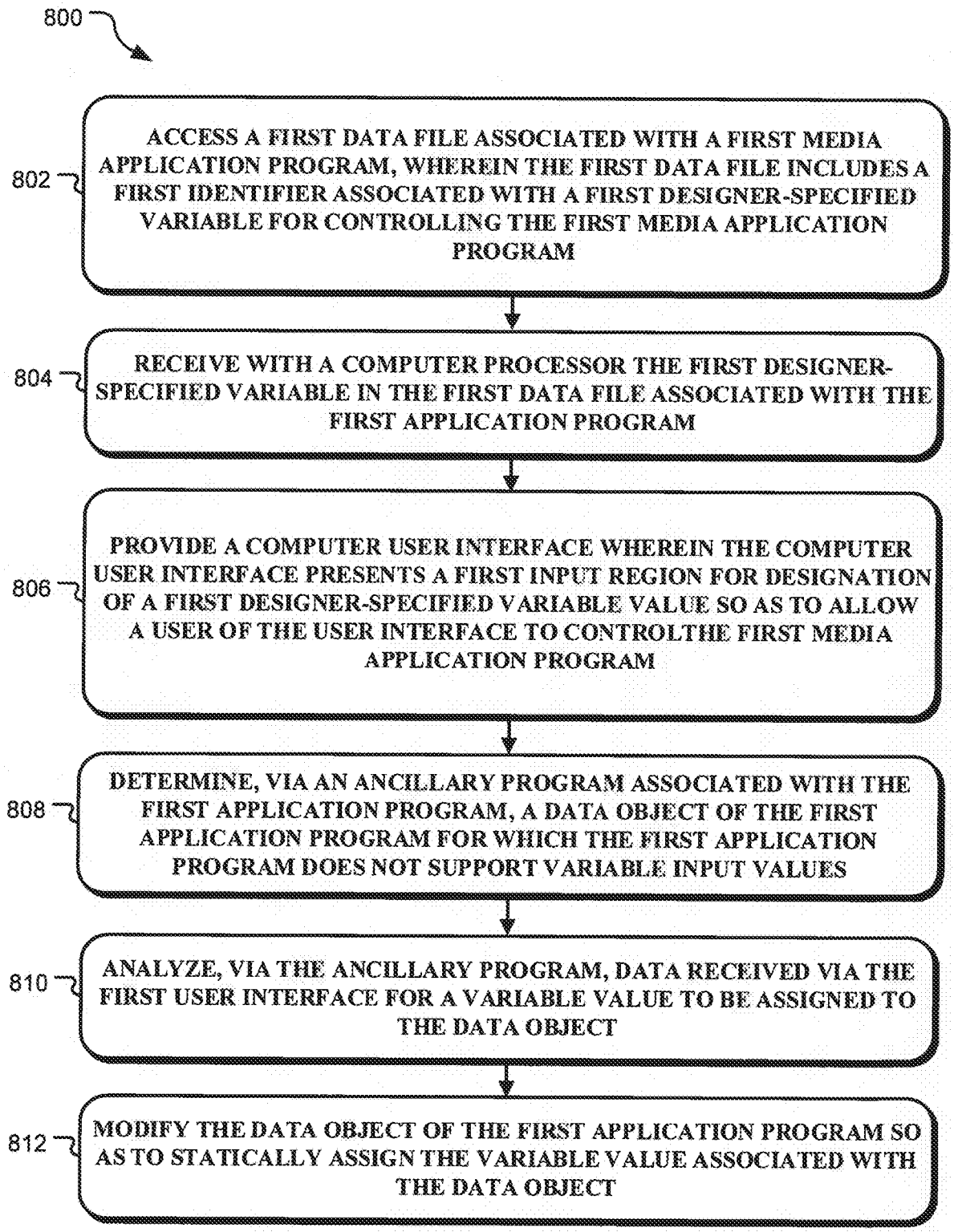
FIG. 8 is a flow chart that illustrates a method of communicating data from a user interface to an application program, in accordance with one embodiment.

FIG. 8 illustrates another example of communicating input data received via a user interface to an application program. In this example, the data is inserted into the application program's internal data structures. In operation 802 of flow chart 800, a first data file is accessed that is associated with a first media application program. The first data file includes a first identifier that is associated with a first designer-specified variable for controlling the first media application program.

In operation 804, a user interface program working in conjunction with a computer processor can receive a first designer specified variable. For example, the user interface program implemented by a computer processor can analyze a first data file that is associated with a first application program to try to detect a designer-specified variable(s). If a variable is detected, the user interface program can add that variable to a user interface so that a value for the variable can be solicited from a user. Still further, in accordance with one embodiment, the user interface program can identify the variable by detecting an identifier associated with the variable in the first data file.

The user interface program can provide a computer user interface wherein the computer user interface presents a first input region for designation of a first designer-specified variable value. This allows a user of the user interface to control the first media application program by supplying values for different variables used by the first application program.

In operation 808, an ancillary program, such as a plug-in program, that is associated with the first application program can determine a data object (variable) of the first application program for which the first application program does not support variable input values, e.g., does not support the use of scripts to receive variable values. The ancillary program may then analyze data received via the user interface, such as a hash of data, for a variable value to be assigned to such a data object (variable), as shown in operation 810. When such a variable value is detected, the data object (variable) of the first application program may be modified by the ancillary program so as to statically assign the variable value to the data object, as shown in operation 812. In one embodiment, an identifier can be included in the hash along with the variable value so as to identify to the ancillary program the data object (variable) that the variable value belongs to.

In some embodiments, the procedures of FIGS. 7 and 8 may be combined so as to pull data values from a hash input received from the user interface program (as shown in FIG. 7) and to push data values into an application program data file, via an ancillary program, when the data objects do not typically support variable values (as shown in FIG. 8).

Figure 9:
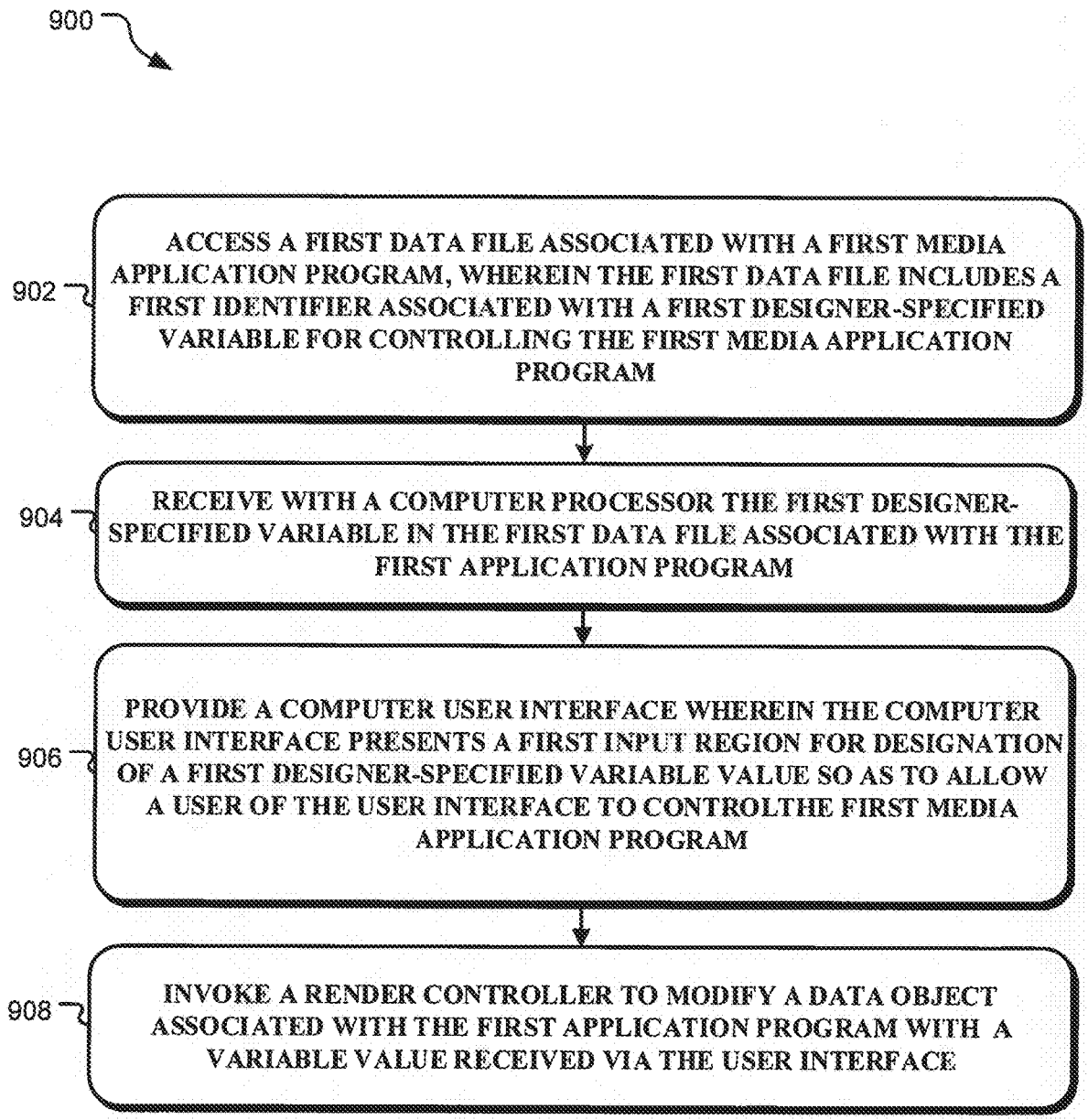
FIG. 9 is a flow chart that illustrates a method of modifying a data object of an application program in accordance with one embodiment.

FIG. 9 illustrates another example of communicating data entered via a user interface. In operation 902 of flow chart 900, a first data file associated with a first media application program is accessed. The first data file in this example includes a first identifier associated with a first designer specified variable for controlling the first media application file. In operation 904, a computer processor receives the first designer-specified variable. And, in operation 906, a computer user interface is provided. The computer user interface can present a first input region for a user to designate a value for a first designer-specified variable. This allows the user to control the first application program via the user interface.

In operation 908, a render controller can be invoked. The render controller can be invoked as a program separate from a user interface program or integrated as a function of the user interface program. The render controller can implement a workflow that modifies a data object associated with the first application program so that the data object is assigned the variable value entered by the user to the user interface. In one example, the data file of the first application program is modified by the render controller so as to statically assign the variable value to the data object. In one embodiment, the application program can be invoked after the data file of the first application program has been modified by the render controller.

Figure 10:
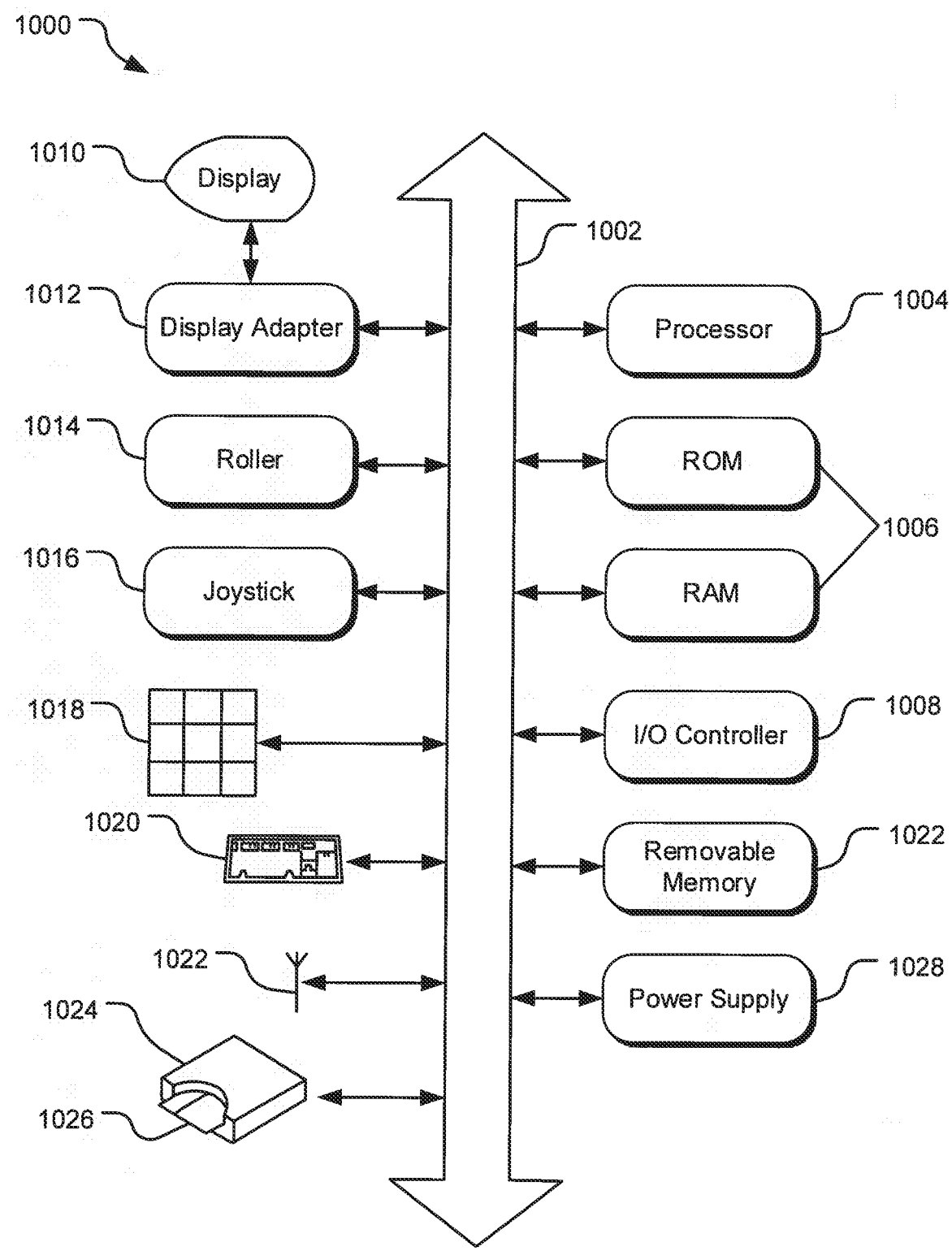
FIG. 10 is a block diagram of a computer system in accordance with one embodiment.

FIG. 10 discloses a block diagram of a computer system 1000 suitable for implementing aspects of at least one implementation. As shown in FIG. 10, system 1000 includes a bus 1002 which interconnects major subsystems such as a processor 1004, internal memory 1006 (such as a RAM or ROM), an input/output (I/O) controller 1008, removable memory (such as a memory card) 1022, an external device such as a display screen 1010 via a display adapter 1012, a roller-type input device 1014, a joystick 1016, a numeric keyboard 1018, an alphanumeric keyboard 1020, smart card acceptance device 1024, a wireless interface 1022 and a power supply 1028. Many other devices can be connected. Wireless interface 1022 together with a wired network interface (not shown), may be used to interface to a local or wide area network (such as the Internet) using any network interface system known to those skilled in the art.

Many other devices or subsystems (not shown) may be connected in a similar manner. For example, a module that facilitates voice-activated commands may be implemented. Also, it is not necessary for all of the devices shown in FIG. 10 to be present to practice an embodiment. Furthermore, the devices and subsystems may be interconnected in different ways from that shown in FIG. 10. Code to implement one embodiment may be operably disposed in the internal memory 1006 or stored on storage media such as the removable memory 1022, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory). For example, in an embodiment of the computer system 1000, code for implementing user interface program(s) may be stored in the internal memory 1006 and configured to be operated by the processor 1004.

Figure 11:
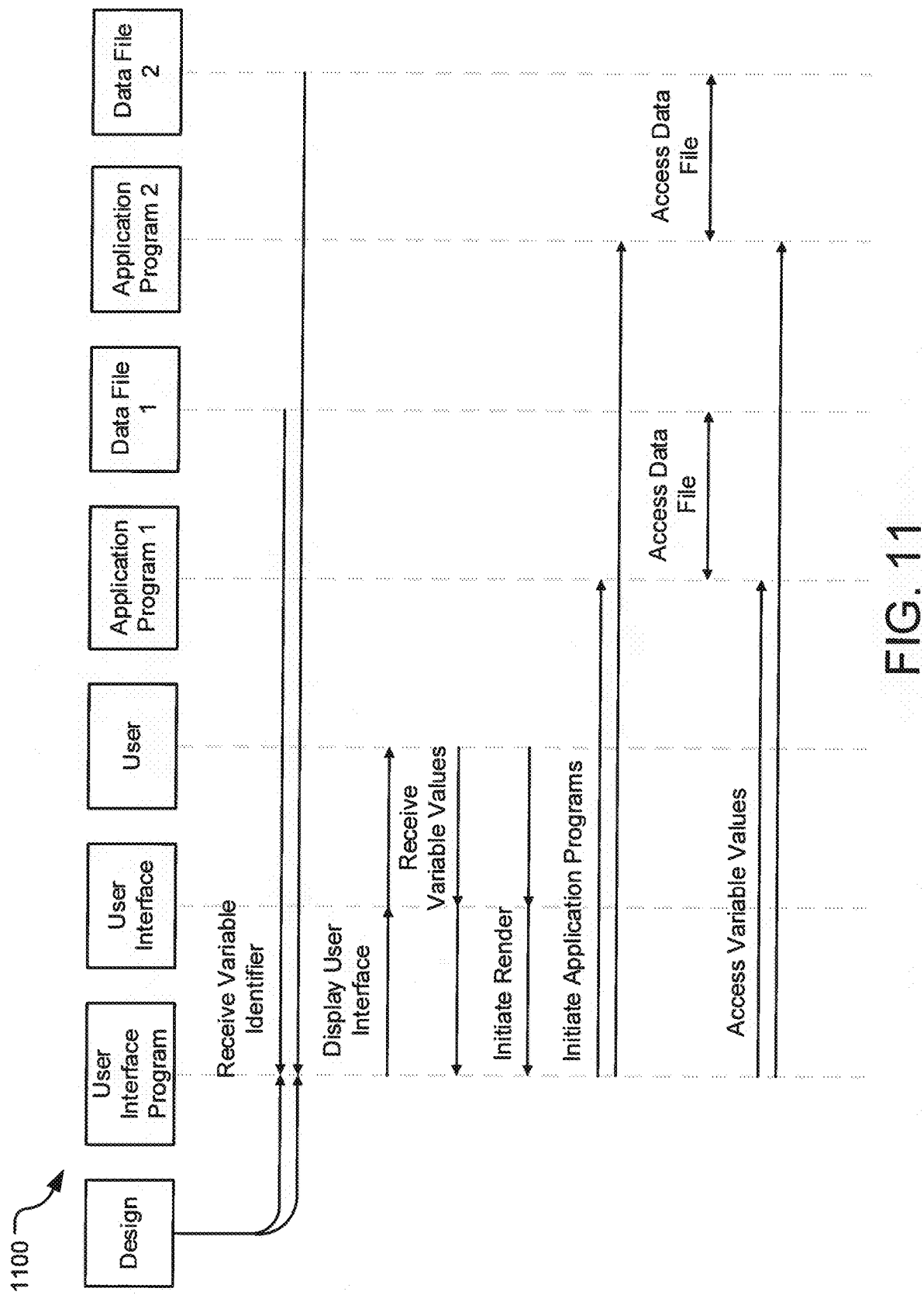
FIG. 11 is a sequence diagram that illustrates a method of conveying user input data to application programs in accordance with one embodiment.

FIG. 11 illustrates an example via a sequence diagram of a method 1100 of providing variable values to application programs via a user interface. In this example, a user interface program can receive data from a designer as well as from data file 1 and data file 2. The designer, for example, can store a lookup table of identifiers and variables in the user interface program that allows the user interface program to use an identifier received from an application program to lookup the associated variable assigned to that identifier.

The user interface program can then display a user interface to a user. The user can input variable values via the user interface which are similarly input to the user interface program. Once the user has entered values to the user interface, the user can initiate a render operation via the user interface.

In response to the render signal, the user interface program can initiate the application programs, in this example Application #1 and Application #2. The application programs access their respective data files for project information. And the variable values entered by the user can be passed to the application programs from the user interface program, e.g., in a hash of command line data.

As noted above in examples 7 and 8, the application programs may use identifiers in the hash to access variable values to be used in the application programs.

Figure 12:
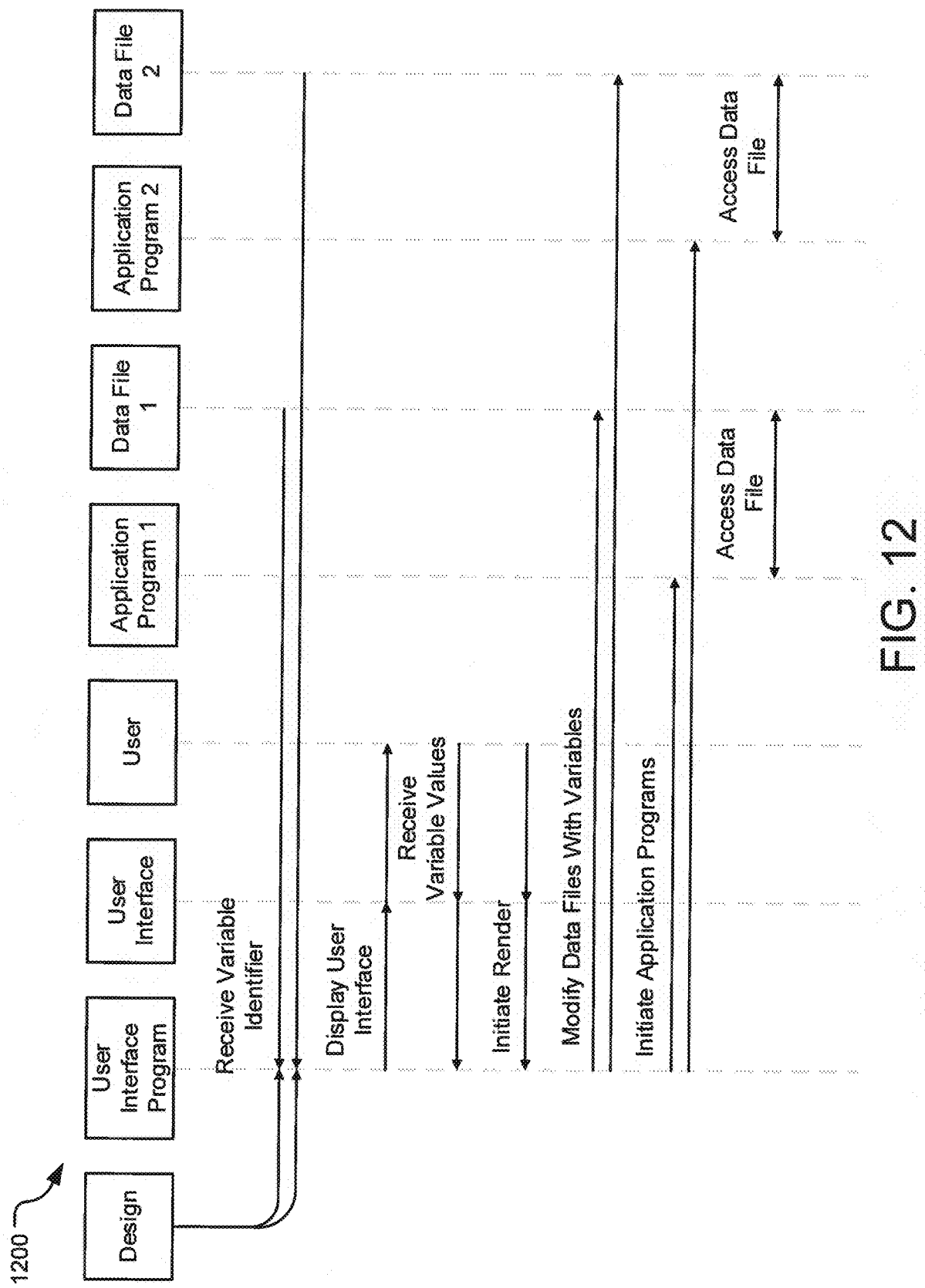
FIG. 12 is a sequence diagram that illustrates a method of conveying user input data to application programs in accordance with another embodiment.

FIG. 12 illustrates another example via a sequence diagram of a method 1200 of providing variable values to application programs via a user interface. In this example, a user interface program can receive data from a designer as well as from data file 1 and data file 2. The designer, for example, can store a lookup table of identifiers and variables in the user interface program that allows the user interface program to use an identifier received from an application program to lookup the associated variable assigned to that identifier.

The user interface program can then display a user interface to a user. The user can input variable values via the user interface which are similarly input to the user interface program. Once the user has entered values to the user interface, the user can initiate a render operation via the user interface.

In response to the render signal, the user interface program can modify the data files directly. This embodiment is applicable to application programs that do not readily facilitate the modification of data objects, e.g., via scripts. Thus, the user interface program can operate on a data file directly so as to assign a data object within the data file a static value that was provided by the user via the user interface. This can be facilitated by searching the data file for an identifier associated with the data object (variable) and then modifying the data object after locating.

Once the data files have been modified, the user interface program can initiate the application programs. The application programs may then access their respective modified data files.

Figure 13:
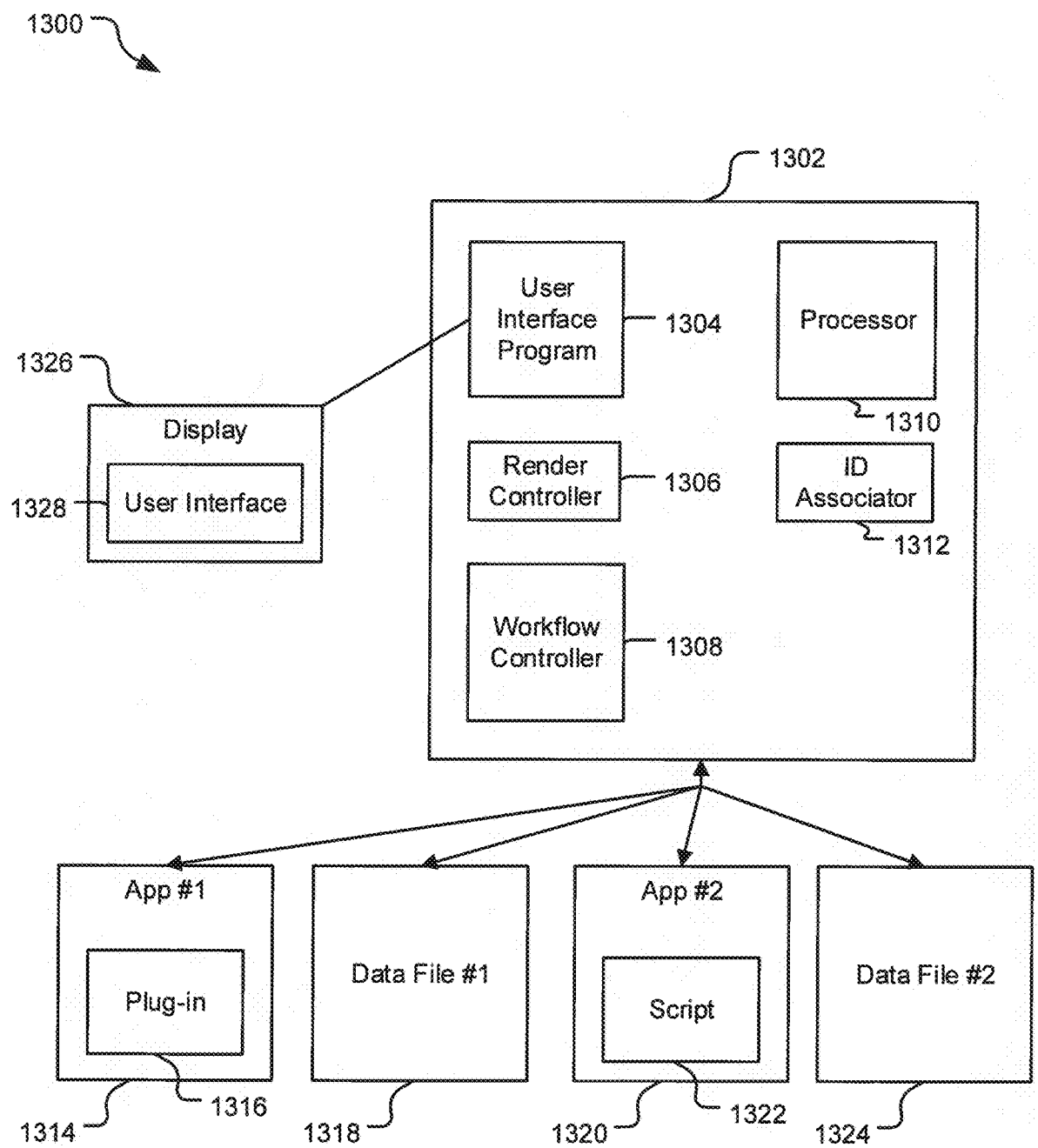
FIG. 13 is a block diagram of a system for implementing a computer user interface in accordance with one embodiment.

FIG. 13 illustrates a system 1300 which can be used to provide a user interface in accordance with one embodiment. FIG. 13 shows a computing device 1302 which includes a computer processor 1310. The computer processor can implement computer code stored in memory so as to implement the user interface program 1304, the render controller 1306, the workflow controller 1308. In addition, an identifier (ID) associator 1312 is shown. The ID associator allows identifiers received from application programs to be associated with variable values. Moreover, the ID associator allows the identifiers received from application programs to be associated with user interface identifiers, as previously illustrated in FIGS. 4 and 5. The computing device is in communication with Application program #1, 1314, and its associated data file #1, 1318. Application program #1 is shown as having a plug-in, 1316. The computing device 1302 is also shown to be in communication with Application #2, 1320 and its associated data file #2, 1324. Application #2 includes a script program, 1322. The computing device is also in communication with a display device 1326. The display device can display a user interface 1328 in response to the user interface program running on the processor.

Media application programs can be understood to include, for example, application programs that perform operations such as compositing, animation, morphing and warping, 3D (modeling, lighting, animation, etc.), rendering, editing (combining clips in sequence, adding transitions, etc.), audio mixing, and audio filtering. This is not an exhaustive list.

While a user interface program has been represented as an individual program in the examples given above, it should be appreciated that a user interface program can actually be comprised of several smaller programs that are combined to create a user interface program. Therefore, the term user interface program is intended to cover not only a single user interface program but also multiple programs that are combined to form user interface program functionality.

In the above description, for the purposes of explanation, numerous specific details are set forth in order to provide a thorough understanding of the embodiments described. It will be apparent, however, to one skilled in the art that these embodiments may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential, as other embodiments may omit such features.

In the interest of clarity, not all of the routine functions of the embodiments described herein are shown and described. It will, of course, be appreciated that in the development of any such actual embodiment, numerous implementation-specific decisions must be made in order to achieve the developer's specific goals, such as compliance with application—and business-related constraints, and that those specific goals will vary from one embodiment to another and from one developer to another.

According to one embodiment, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, PHP, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows 8, Windows 7, Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Computer storage devices may include a variety of tangible computer-readable storage media and intangible computer-readable communication signals. Tangible computer-readable storage can be embodied by any available media that can be accessed and includes both volatile and non-volatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, programs or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a computing device. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal"

means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Furthermore, structural features of the different implementations may be combined in yet another implementation without departing from the recited claims.

What is claimed is:

1. A method comprising:
accessing a first data file associated with a first media application program, wherein the first data file includes a first identifier associated with a first designer-specified variable for controlling the first media application program;
accessing a second data file associated with a second media application program, wherein the second data file includes a second identifier associated with a second designer-specified variable for controlling the second media application program;
providing a computer user interface wherein the computer user interface is configured to allow a user of the user interface to control both the first media application program and the second media application program and wherein the computer user interface is configured to use a computer processor to detect in the first data file at least the first identifier associated with the first designer-specified variable for controlling the first media application program by detecting a pre-programmed format of the first identifier and wherein the computer user interface is configured to use the computer processor to detect in the second data file at least the second identifier associated with the second designer-specified variable for controlling the second media application program by detecting a pre-programmed format of the second identifier;
communicating the first designer-specified variable value from the user interface to the first application program.

2. The method of claim 1 wherein the computer user interface presents a first input region for designation of a first designer-specified variable value and a second input region for designation of a second designer-specified variable value.

3. The method of claim 2 and further comprising:
communicating the second designer-specified variable value from the user interface to the second application program.

4. The method as claimed in claim 3 wherein the user interface controls the first media application program and the second media application program without a user interacting directly with the first media application program and the second media application program.

5. The method as claimed in claim 3 and further comprising:
invoking the first media application program and the second media application program in response to a user command entered via the computer user interface.

6. The method as claimed in claim 5 wherein the invoking comprises the first media application program invoking the second media application program.

7. The method as claimed in claim 3 and further comprising:
associating the first identifier with a first user interface identifier; and
associating the second identifier with a second user interface identifier.

8. The method as claimed in claim 3 and further comprising:
associating both the first identifier and the second identifier with a first user interface identifier when both the first identifier and the second identifier are associated with a common variable.

9. A system comprising:
a first media application program;
a second media application program;
a first data file associated with the first media application program, wherein the first data file includes a first identifier associated with a first designer-specified variable for controlling the first media application program;
a second data file associated with the second media application program, wherein the second data file includes a second identifier associated with a second designer-specified variable for controlling the second media application program;

a computer user interface wherein the computer user interface is configured to allow a user of the user interface to control both the first media application program and the second media application program and wherein the computer user interface is configured to use a computer processor to detect in the first data file at least the first identifier associated with the first designer-specified variable for controlling the first media application program by detecting a pre-programmed format of the first identifier and wherein the computer user interface is configured to use the computer processor to detect in the second data file at least the second identifier associated with the second designer-specified variable for controlling the second media application program by detecting a pre-programmed format of the second identifier; and wherein the computer processor:

communicates the first designer-specified variable value from the user interface to the first application program.

10. The system as claimed in claim 9 wherein the computer user interface presents a first input region for designation of a first designer-specified variable value and a second input region for designation of a second designer-specified variable value.

11. The system as claimed in claim 10 wherein the computer processor communicates the second designer-specified variable value from the user interface to the second application program.

12. The system as claimed in claim 10 wherein the user interface controls the first media application program and the second media application program without a user interacting directly with the first media application program and the second media application program.

13. The system as claimed in claim 10 wherein the computer processor invokes the first media application program and the second media application program in response to a user command entered via the computer user interface.

14. The system as claimed in claim 13 wherein the invoking comprises the first media application program invoking the second media application program.

15. The system as claimed in claim 10 and further comprising:

the computer processor associating the first identifier with a first user interface identifier; and the computer processor associating the second identifier with a second user interface identifier.

16. One or more non-transitory computer-readable storage media encoding computer-executable instructions for executing on a computer system a computer process, the computer process comprising:

accessing a first data file associated with a first media application program, wherein the first data file includes a first identifier associated with a first designer-specified variable for controlling the first media application program;

accessing a second data file associated with a second media application program, wherein the second data file includes a second identifier associated with a second designer-specified variable for controlling the second media application program;

providing a computer user interface wherein the computer user interface is configured to allow a user of the user interface to control both the first media application program and the second media application program and wherein the computer user interface is configured to use a computer processor to detect in the first data file at least the first identifier associated with the first designer-specified variable for controlling the first media application program by detecting a pre-programmed format of the first identifier and wherein the computer user interface is configured to use the computer processor to detect in the second data file at least the second identifier associated with the second designer-specified variable for controlling the second media application program by detecting a pre-programmed format of the second identifier;

communicating the first designer-specified variable value from the user interface to the first application program.

17. The one or more non-transitory computer-readable storage media of claim 16 wherein the computer user interface presents a first input region for designation of a first designer-specified variable value and a second input region for designation of a second designer-specified variable value.

18. The one or more non-transitory computer-readable storage media of claim 17, the computer process further comprising:

communicating the second designer-specified variable value from the user interface to the second application program.

19. The system as claimed in claim 10 and further comprising:

the computer processor associating both the first identifier and the second identifier with a first user interface identifier when both the first identifier and the second identifier are associated with a common variable.

* * * * *